Nov. 25, 1924.                                                        1,517,046
C. L. BURDICK
METHOD AND PROCESS FOR THE LEACHING OF CALICHE AND FOR THE RECOVERY
OF NITRATE THEREFROM
Filed Nov. 7, 1921

INVENTOR.
Charles Lalor Burdick
BY
Pennie Davis Marvin & Edmonds
ATTORNEYS.

Patented Nov. 25, 1924.

1,517,046

UNITED STATES PATENT OFFICE.

CHARLES LALOR BURDICK, OF NEW YORK, N. Y., ASSIGNOR TO GUGGENHEIM BROTHERS, OF NEW YORK, N. Y., A COPARTNERSHIP.

METHOD AND PROCESS FOR THE LEACHING OF CALICHE AND FOR THE RECOVERY OF NITRATE THEREFROM.

Application filed November 7, 1921. Serial No. 513,335.

*To all whom it may concern:*

Be it known that I, CHARLES LALOR BURDICK, a citizen of the United States, residing at New York, in the county of New York, State of New York, have invented certain new and useful Improvements in Methods and Processes for the Leaching of Caliche and for the Recovery of Nitrate Therefrom; and I do hereby declare the following to be a full, clear, and exact description of the invention, such as will enable others skilled in the art to which it appertains to make and use the same.

The present invention relates particularly to processes for leaching nitrate ores (caliche) at atmospheric or tepid temperatures in such improved manner as to permit the more economical and efficient extraction of the nitrate therein contained than is accomplished in the present practice of the art and industry.

A further purpose of the present invention is the manner of treating the strong solutions produced from the leaching of caliche, the recovery of the nitrate therefrom and the production of the mother liquor which is utilized as the chief solvent in the leaching process.

The invention is based upon a systematic study of the chemistry of the solutions arising from the leaching of caliche, which study has disclosed numerous facts of direct bearing on the orderly leaching of said material, which in the industry as it is today constituted are, in general, unknown, and the significance and bearing thereof unappreciated. By the application of these principles as hereinafter set forth and explained, the inauguration and maintenance of a leaching process more simple and more economical than any heretofore put into successful commercial application has now been made possible. Likewise by the same means solutions more nearly saturated and in other ways more suitable for the operations of recovery of the nitrate therein contained are made available.

Figure 1:
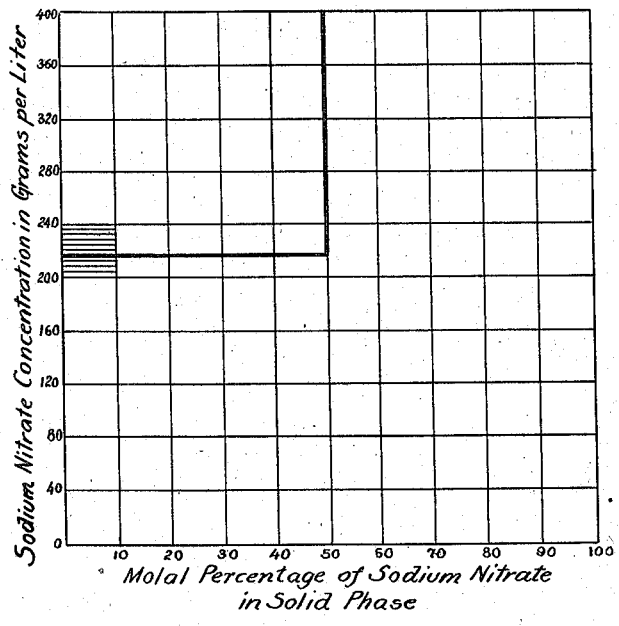

It is appropriate to the explanation of the results of this systematic investigation to consider first the simple case of solutions containing in pure form those compounds or combinations of elements commonly considered to be the main soluble components in caliche, namely, sodium nitrate, sodium chloride and sodium sulphate. To make more plain the conditions encountered in leaching a caliche of such constitution the accompanying experimentally determined diagram, shown in Fig. 1, will be referred to. In leaching a caliche, the solutions rapidly become saturated with sodium chloride and once saturated suffer substantially no change in concentration in the subsequent steps of the operations. The presence of excess sodium chloride as a solid phase in the caliche may therefore be disregarded. In the diagram of Fig. 1 are presented the solubility relations of solutions at 20° C. saturated with sodium chloride in contact and at equilibrium with solid phases containing sodium sulphate and sodium nitrate in varying proportions. In this diagram the abscissæ represent the molal percentages of sodium nitrate in any mixture of sodium nitrate and sodium sulphate and the ordinates the sodium nitrate concentrations in grams per litre for any solution at equilibrium with such mixtures. (The term "mol" is used throughout this application to mean a quantity of any element or chemical compound, which expressed in terms of any units of weight which may be convenient, is equal to the molecular weight of that element or compound.) Thus, for example, in a solution saturated in sodium chloride, brought into contact with a nitrate sulphate mixture in which the nitrate predominates or is continuously maintained in a proportion greater than one molecule of nitrate to one molecule of sulphate (represented by a molal percentage greater than 50 in the diagram of Fig. 1), that is, greater than the proportion of 85 parts of sodium nitrate to 142 parts of sodium sulphate, the nitrate concentration of the resulting solution may advance up to about 400 grams per litre. On the other hand, in a solution brought into contact with a mixture in which sulphate predominates or is maintained in a proportion greater than one molecule of sulphate to one molecule of nitrate (represented by a molal percentage of less than 50 in the diagram of Fig. 1), the strength of the solution in terms of nitrate of soda will not advance beyond about 216 grams per litre. Furthermore, either of these solutions when brought into contact with mixtures opposite in character to those from which they were produced, as above explained, will alter their compositions in such a way that from the solution containing about 400 grams of nitrate per litre, nitrate will be precipitated into the solid phase until the concentration in the solution drops to about 216 grams per litre and in the other case nitrate will be removed from the solid phase until the strength of solution advances from about 216 grams per litre to about 400 grams per litre.

The explanation and novel feature embodied in these results is that in these solutions and such solutions as are in general produced by the cold leaching of caliche the conditions of solubilities are such as to make stable a compound between sodium nitrate and sodium sulphate, constituted in the proportion of one molecule of each component. As a solid phase in contact with solution at 20° C. this compound is stable at and above all nitrate concentrations of about 216 grams per litre and insoluble in such solutions and from it, therefore, no nitrate can be dissolved, this component being in a combined and not a free state. In contact with solutions below about 216 grams per litre concentration, the compound is unstable and such portions of it will dissociate and decompose until the nitrate concentration of the solution reaches approximately 216 grams per litre, at which concentration dissociation of the compound and dissolution of nitrate will cease. It is evident from the discussions that dry mixtures, such as a caliche containing only the chlorides, nitrates and sulphates of sodium may not contain the compound, but that, immediately upon application of the leaching solution, a water interaction can take place and combination become possible. The consequences of the existence of the nitrate-sulphate compound are of such significance that their main bearing on the leaching problem will be here set forth, it being borne in mind that this discussion is now limited to caliche consisting essentially of inert material and the salts, sodium chloride, sodium nitrate and sodium sulphate.

(1) In a cyclical leaching process operating at 20° C., involving as leach solutions mother liquors saturated as they would be with chloride and nitrate-sulphate compound and of total strength in nitrate equal to or greater than about 216 grams per litre, it is not possible to obtain from a mixture of nitrate and sulphate a greater quantity of nitrate than that which will reduce the sodium nitrate in the residue to a nitrate content in a proportion to the sodium sulphate present of one molecule to one molecule, that is, greater than the proportion of 85 parts of sodium nitrate to 142 parts of sodium sulphate. For example, from a mixture containing 170 grams sodium nitrate and 142 grams sodium sulphate, 85 grams of the sodium nitrate may be quickly and readily dissolved using as the solvent a mother liquor containing 300 grams per litre and giving approximately 850 cubic centimeters of a solution assaying about 400 grams per litre. The remaining nitrate is insoluble in such a mother liquor or in mother liquor of any nitrate concentration above about 216 grams per litre.

(2) In a leaching process at 20° C. using water for the complete extraction of the nitrate it is possible to produce from a caliche giving a residue containing sodium sulphate and sodium chloride a solution of a concentration of about 400 grams per litre corresponding to the free nitrate only that may be present (i. e. the sodium nitrate in excess of one molecule sodium nitrate to one molecule sodium sulphate), and an additional solution of the remaining nitrate at a maximum concentration of about 216 grams per litre.

It is the purpose of the present invention to make possible a leaching process operating in such manner as to permit a cold or tepid leaching of caliche (in contradistinction to the present boiling method) in a cyclical and orderly manner, which will accomplish substantial dissolution of all the nitrate in normal caliches and will permit the production of the entire solution as strong solutions approaching or exceeding the solubility of free nitrate at 20° C., namely about 360 grams per litre, in contradistinction to the production of a portion of the solution at a maximum of about 216 grams per litre as maintained by authorities in the industry today as necessary to obtain commercially satisfactory extraction.

My investigations have shown that the hereinbefore mentioned difficulty which in past attempts has militated against obtaining solutions sufficiently concentrated in nitrate, when using cold or tepid leaching processes, can be circumvented in two manners, the preferable practices of which are explained in the following.

My investigations have shown that an efficient and desirable way of preventing or circumventing the disturbing influence of the nitrate-sulphate compound from manifesting itself is by controlling and properly proportioning the content in the caliches and in the leaching solutions of certain elements or compounds which have in the past practice in the industry been considered minor and unimportant constituents and to the presence of which no significance in this connection was attached. These elements and compounds can be characterized as those which are able to exert preferential combining affinity for the sulphate radicle group ($SO_4$) and for sodium sulphate ($Na_2SO_4$). The chief of the first of these are the elements calcium, potassium and magnesium; and of the second, the chief, magnesium and calcium. In general in leaching a caliche with a solution or mother liquor deficient in the above substances, the proportion of sulphate or sulphate radicle will remain or be attached to the calcium therein contained up to its combining capacity, for instance, as calcium sulphate or calcium sodium sulphate, and the remaining, or excess of sulphate will attach itself and combine with sodium nitrate to form the nitrate sulphate compound insoluble in the leach solutions customarily employed in processes of cold leaching. The recovery of nitrate from a caliche treated in such a manner would be limited to the free nitrate therein contained, for example, a caliche assaying 15% nitrate and 10% sodium sulphate would yield, in ordinary leaching with such solutions, deficient in the above mentioned constituents, only nine-fifteenths of the nitrate content, the remaining six-fifteenths being attached to the sodium sulphate and being therefore insoluble in the cyclically employed solutions or mother liquor.

The present invention involves the leaching of the caliche at cold or tepid temperatures with a leach solution containing sufficient concentrations of one or more stabilizing agents (such as potassium, magnesium, calcium, sodium, and the like) as will insure the stability of protective compounds (such as sodium magnesium sulfate, potassium calcium sulfate, sodium calcium sulfate and the like) in the presence of free nitrate, components of which protective compounds would otherwise, by rearrangement, combine with and render unavailable a greater or less proportion of the total nitrate in the caliche. In the presence of sufficient concentrations of the stabilizing agents in the leach liquor, the nitrate-sulfate compound, which would otherwise be insoluble, is made unstable so that the nitrate can be dissolved, while other sulfate compounds are stabilized and remain insoluble.

In the preferred practice of the invention the solutions are maintained at the fullest possible concentrations of the above mentioned stabilizing agents by regulating, minimizing or avoiding entirely their removal from the leaching cycle as a consequence of the recovery process adopted. By the maintenance of these agents in the solution, notably potassium and magnesium, at their full concentrations, complete stabilization of the above mentioned protective compounds of selective affinity for sulphate is secured. Of these compounds the chief are syngenite, calcium potassium sulphate, and astrakanite, magnesium sodium sulphate. The maintenance in the solutions of potassium at concentrations approaching 20 grams per litre accomplishes the binding, for example, as syngenite, of twice as much of the $SO_4$ radicle as calcium sulphate alone would take and the maintenance of magnesium at concentrations approaching 21 grams per litre accomplishes the fixing, for instance as astrakanite, of twice the molecular quantity of sulphate as there are molecules of magnesium. In this manner of operation the proportion of residual sulphate remaining to combine with sodium nitrate may be greatly diminished or even eliminated entirely, permitting a satisfactory and commercially complete extraction of the caliche.

Among the means of accomplishment of these herein set forth desirable results consist firstly, in the preferred practices of the invention in controlling the recovery process so that the stabilizing agents are not permanently removed from the cycle of operations by the recovery process to an extent greater than corresponds to the excess of them contained in the caliche mixtures under treatment, secondly, in the selection and mixing of caliches containing excess of the stabilizing constituent with caliches deficient in such and in the proper combination so as to secure a mixture which on leaching will contain minimum amounts of combined nitrate and therefore capable of yielding effective and commercially satisfactory extraction, thirdly, in the addition of materials, other than caliche, rich in stabilizing agents, as, for instance, magnesium sulphate or calcium sulphate arising as by-products from recovery operations or other sources.

I have also found that there is present in some caliches, particularly in those of low nitrate content, an anhydrous compound occurring in nature as the mineral known as glauberite and constituted in the proportion of one molecule of sodium sulphate to one molecule of calcium sulphate. This compound, in contra-distinction to the other compounds above mentioned, i. e., syngenite, astrakanite and the compound of sodium sulphate and sodium nitrate in all cases occurs already formed in the caliche, and does not as readily form by water interaction in the leaching of caliche at atmospheric or tepid temperatures as do the other compounds. It is, however, stable under these conditions, provided certain concentrations of sodium chloride and sodium sulphate are maintained in the leach solutions. Inasmuch as in leaching caliche the solutions rapidly become saturated in sodium chloride and this condition is maintained throughout the leaching operations, I have confined my investigation of the conditions under which stability of this compound can be maintained to solutions saturated in sodium chloride but with varying concentrations of sodium nitrate and sodium sulphate and have found that in a solution free of nitrate, but saturated in sodium chloride, the anhydrous form of glauberite is stable if the concentration of sodium sulphate in the solution is maintained at or above 30 grams per litre. As the nitrate concentration of the solutions increases, the required concentration of sodium sulphate for the maintenance of stability decreases until in a solution carrying 400 grams per litre of sodium nitrate and saturated in sodium chloride a concentration of only 16 grams per litre of sodium sulphate is necessary. Thus in caliches in which anhydrous glauberite is present, by the maintenance of proper concentrations of sodium sulphate in the leach and wash liquors, twice as many sulphate radicles as there are mols of calcium present can be permanently tied up and correspondingly less amount of free sodium sulphate will be present, which might be available to form the compound constituted in the proportion of one molecule of sodium nitrate to one molecule of sodium sulphate, and by its formation would prevent the concentration of the strong solutions from exceeding about 216 grams per litre, as noted above.

My further investigations have shown that the influence of temperature on the nitrate-sulphate compound is such that with moderate increases of temperature the dissociation tendency of the compound advances relatively much more rapidly than the increase in the solubility of free nitrate, and therefore the concentration of nitrate in the solution arising from leaching such a compound may increase to a very large extent. For instance, in a given solution in which the nitrate solubility from the compound at 20° C. is limited to about 216 grams per litre (as compared with 360 grams per litre at 45° C.) at and above temperatures of 58° C., the dissociation of the compound becomes complete, the nitrates from the compound, or formerly of the compound, having the same solubility as free nitrate, namely about 585 grams per litre. It is seen that a caliche consisting chiefly of nitrate-sulphate compound when leached at 45° C. would give a solution of approximately the same concentration as that obtained by leaching caliche containing chiefly free nitrate at 20° C., or if the leaching is carried on at 58° C. all the nitrate can be dissolved giving solutions of strengths approaching 585 grams per litre.

Furthermore, the employment of such stabilizing agents as hereinbefore described and which are of such composition that the sodium nitrate can be extracted from the caliche without extracting any substantial amount of sodium sulphate is of particular value and advantage in certain processes, in that the sodium sulphate in the leached residue is left in the undissolved state. For example, in the operation of processes of classification and separate washing of the slimes arising from the breaking or crushing of the caliche or from the leaching operations, the leaving of the sodium sulphate, etc., undissolved in the residue enables the slimes to be settled and thickened for filtration much more readily than when sodium sulphate, etc., is dissolved along with the sodium nitrate. This fact I have established by actual comparative experimentation, I having found that slimes resulting from leaching caliche with solutions containing stabilizing agents may settle several times as readily, and filter much more easily than do slimes resulting from the leaching of the same caliche with solutions in which such stabilizing agents are not present, as hereinbefore specified.

From the foregoing description relating as it does purely to leaching operations it is clear, and it is the sense of this application that the invention applies to any process of leaching caliche at cold or tepid temperatures which makes use of, or takes advantage of, the benefits arising from the employment of the stabilizing elements and substances as hereinbefore specified, their maintenance in or their contribution to the solutions completely irrespective of the nature of the process employed for the recovery of nitrate from the leach solutions.

For the purposes of definition in the sense of this application the phrase "atmospheric and tepid temperatures" shall be understood to cover the range of temperatures up to substantially that degree of temperature at which occurs complete dissociation of the compound of sodium nitrate and sodium sulphate in solutions saturated as hereinbefore described, namely, up to 58° C.

One method of treatment of the strong solutions arising from the leaching of caliche according to the hereinbefore specified method for the purpose of the recovery of nitrate therefrom with the consequent returning of a mother liquor appropriate for the continuance of the leaching operations is by the employment of artificial refrigeration.

Figure 2:
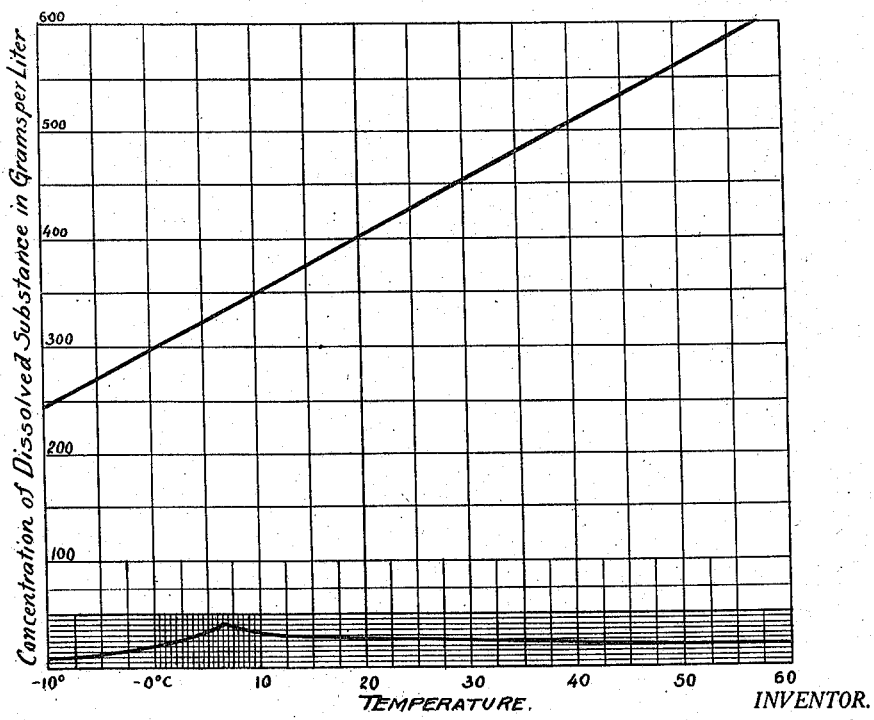

In order that the underlying chemical phenomena involved in the practice of the invention may be more clearly understood and particularly the requirements of the refrigeration cycle, reference is made to the accompanying diagram, shown in Fig. 2 which summarizes the results of certain tests made by me for the purpose of determining the solubilities of sodium nitrate in solutions saturated with sodium chloride, and in contact with solid phases containing sodium nitrate and sodium sulphate, the nitrate being present in molecular excess over the sulphate. As the temperature decreases, the solubility of the nitrate decreases, as indicated in the upper part of Fig. 2 whereas the solubility of the sulphate increases, approaching a maximum at a temperature of approximately 7° C., as illustrated in the curve appearing at the lower part of Fig. 2. This temperature is a transition point, and is the point at which the three solid phases, to wit: (1) sodium nitrate, (2) the compound constituted in the proportion of one molecule of sodium nitrate to one molecule of sodium sulphate, and (3) hydrated sodium sulphate may coexist. Above this temperature the solid phases will, in general, consist of sodium nitrate and the compound referred to. Below this temperature the phases which may exist are sodium nitrate and hydrated sodium sulphate.

As indicated in the diagram the curve of solubility of hydrated sodium sulphate is very steep, indicating a most rapid decrease in sodium sulphate solubility at temperatures below 7° C. Thus, the decrease in solubility of sodium sulphate between 7° C. and 2° C. in saturated solutions is as much as the entire decrease in solubility in saturated solutions between 7° C. and 32° C. In general, cooling a solution, saturated or nearly saturated, with sodium nitrate and sodium sulphate (such as is produced in leaching a caliche consisting chiefly of sodium nitrate, sodium chloride and sodium sulphate) will bring about a precipitation of the nitrate, in consequence of its decrease in solubility. On the other hand, my tests have shown that in consequence of the increase in solubility of the sodium sulphate, no precipitation of this impurity occurs until a point is reached below 7° C. at which the solubility of the hydrated form of the salt has fallen to the sodium sulphate concentration obtaining in the solution. Below this temperature, refrigeration normally effects the simultaneous precipitation of sodium nitrate and hydrated sodium sulphate.

Further tests have shown that, by the addition and maintenance of certain salts (notably salts of magnesium and potassium, borates and iodates) in the solutions in the leaching operation or thereafter, the quantity of sodium sulphate in solution (i. e., the quantity of sodium sulphate as distinguished from the total sulphate in solution) may be very considerably depressed. My further tests have, furthermore, shown that a corresponding depression in solubility of hydrated sodium sulphate is not produced by the presence of these additional elements or compounds. Consequently, the point of transition hereinbefore mentioned may, by the addition of these substances, be lowered to the extent of several degrees of temperature and a correspondingly lower temperature of cooling may be maintained without any separation of the hydrated sodium sulphate. In this manner, the temperature of cooling may be carried to 0° C. or lower with the production of largely augmented yields of pure nitrate.

In the practice of the invention, as herein set forth, it is also of importance that, in the refrigeration process, the lower temperature shall not be below that at which the major portion of the aforesaid valuable minor salts remain in solution, nor below a limit which would cause a precipitation of more of these agents than could be effectively and economically added or contributed in the leaching process, or elsewhere in the general operation.

An important advantage of the present invention is the facility which it affords for the maintenance of the concentration of certain protective and stabilizing salts in the leaching system, as set forth in the first part of this application. There the desirability of the maintenance of certain minimum concentrations of salts, notably among which are salts of magnesium and potassium, in the leach solutions is pointed out. By the process of nitrate recovery described in the present specification, these desirable minimum concentrations can be effectively controlled and maintained and, at the same time, the nitrate product can be obtained at once in a pure and marketable form.

An additional feature of the present invention concerns the temperature of the refrigerating medium used in the final cooling of the solutions. My tests have shown it to be of importance for the maintenance of purity of the nitrate product, and for effective temperature control that the temperature of the refrigerant (brine or ammonia, for example) shall not be so low as to cause such local sub-cooling (i. e., cooling below the desired point) near the walls of the heat transferring surfaces as to precipitate out some of the sulphate and thereby cause it to contaminate the nitrate product as an impurity.

The temperature which may be maintained is also a matter dependent to some extent upon agitation and stirring in the refrigerators. Thus it has been found favorable, in general, when the solutions and suspended solids are moderately agitated, not to maintain the temperature of the cooling brine or ammonia more than 8° C. below the temperature of the body of solution undergoing cooling in the refrigerators.

The advantages and benefits of the use and maintenance of stabilizing agents, as herein specified, in processes of leaching caliche at atmospheric or tepid temperatures, as well as in processes of recovery of nitrate from solutions derived from such leaching operations has now been explained. The invention is, however, of particular advantage and benefit when used in connection with a cyclical method of leaching caliche at atmospheric or tepid temperatures, coupled with the treatment of the resultant strong solutions by refrigeration. Such a cyclical process utilizes all of the advantages and benefits resulting from the use of stabilizing agents, as herein specified, both as regards leaching and refrigeration operations, and as regards the maintenance of the stabilizing agents in the leach solutions. It is the sense of this application therefore that the invention shall apply not only to the separate operations of leaching caliche at atmospheric or tepid temperatures and of recovering nitrate from solutions derived from such operations, but also to any combination of such operations for the extraction of nitrate from caliche.

The invention will be further illustrated by the following specific example. Caliches from different pampas differ in their composition. The following three analyses sufficiently represent the composition of certain of these caliches, each of these analyses being the average of several analyses of caliches from the same pampa:

| | | | |
|---|---|---|---|
| Insoluble | 43.9 | 46.72 | 50.85 |
| Na | 13.9 | 14.29 | 13.79 |
| K | 1.37 | 0.86 | 0.69 |
| Ca | 1.85 | 1.33 | 1.40 |
| Mg | 0.68 | 0.32 | 0.22 |
| $SO_3$ | 10.11 | 7.16 | 7.16 |
| Cl | 12.40 | 13.49 | 13.72 |
| $NO_3$ | 14.65 | 15.8 | 11.86 |

In the leaching of caliche about 165 to 200 tons of leach liquor are used to 50 tons of caliche. In order that the leach liquor employed may contain a sufficient amount of the stabilizing agents, for example, 20 grams or more per liter of potassium and 21 grams or more per liter of magnesium, the leach liquor must contain around 3.5 to 4 tons of potassium and a similar amount of magnesium. This amount is far in excess of that ordinarily present in the caliche. The other constituents for forming the protective compounds are however usually present in the caliche in sufficient amounts, and may even be in excess of that required for forming the protective sulfate compounds herein before referred to, so that when the leach liquor contains sufficient amounts of the stabilizing agents these protective sulfate compounds are stabilized and remain insoluble in the caliche undergoing leaching, thus preventing the formation of and making unstable the sulfate-nitrate compound and permitting the leaching of the free nitrate by the leach liquor so that strong solutions of nitrate can be obtained.

In the carrying out of the cyclic process, using the same liquor for leaching the caliche, crystallizing nitrate therefrom by refrigeration and returning the mother liquor for further leaching, the leach liquor going on to the caliche may contain for example from 300 to 310 grams of nitrate (calculated as sodium nitrate) per liter; from 50 to 60 grams of sodium sulfate; together with 20 or more grams of potassium and 21 or more grams of magnesium per liter. The liquor obtained by leaching the caliche may contain for example 360–370 grams per liter of nitrate (calculated as sodium nitrate), with the amounts of sulfate, potassium and magnesium similar to those above indicated. Some increase in the amounts of potassium and magnesium in the liquor may take place, where the amounts present in the caliche are in excess of those required for forming the desired stable protective sulfate compounds.

When the caliche is deficient in stabilizing agents the deficiency should be supplied, for example, by adding caliche rich in such agents or by otherwise supplying the deficiency. When the caliche and the leach liquor contains or has added thereto sufficient amounts of the components required to form and stabilize the aforementioned protective compounds, the sodium nitrate is no longer held in the form of an insoluble sodium-nitrate-sulfate compound, but can readily be extracted by the leach liquor, while the excess sulfate is left behind in an insoluble form as the stabilized sulfate compounds. When the solution obtained by the leaching operation is then subjected to refrigeration, a part of the sodium nitrate can be recovered directly in a substantially pure form without removing from the solution any appreciable amount of the stabilizing agents, so that these agents are left in the liquor when it is returned for further leaching of caliche.

I claim—

1. The method of extracting nitrate from nitrate-bearing materials containing sulfate, which comprises leaching the material at temperatures not exceeding about 58° C. in the presence of such concentrations in the leaching solution of certain stabilizing agents characterized by the property of rendering stable certain protective sulfate compounds in the presence of free nitrate, components of which protective sulfate compounds would otherwise, by rearrangement, combine with and render unavailable a greater or less proportion of the total nitrate in the nitrate-bearing material.

2. The method of extracting nitrate from nitrate-bearing materials containing sulfate, which comprises leaching the material at temperatures not exceeding about 58° C. in the presence of such concentrations in the leaching solution of certain stabilizing agents characterized by the property of rendering stable certain protective sulfate compounds in the presence of free nitrate, components of which protective sulfate compounds would otherwise, by rearrangement, combine with and render unavailable a greater or less proportion of the total nitrate in the nitrate-bearing material, said protective sulfate compounds remaining in the undissolved state until substantial and satisfactory solution of the available nitrate in the nitrate-bearing material has been accomplished.

3. The method of extracting nitrate from nitrate-bearing materials containing sulfate, which comprises leaching the material at temperatures not exceeding about 58° C. in the presence of suitable and sufficient concentrations in the leaching solution of certain stabilizing agents characterized by the property of rendering stable certain protective sulfate compounds in the presence of free nitrate, components of which protective sulfate compounds would otherwise, by rearrangement, combine with and render unavailable a greater or less proportion of the total nitrate in the nitrate-bearing material, said protective sulfate compounds remaining in the undissolved state until substantial and satisfactory solution of the available nitrate in the nitrate-bearing material has been accomplished.

4. The method of extracting nitrate from nitrate-bearing materials containing sulfate, which comprises leaching the material at temperatures not exceeding about 58° C. in the presence of such concentration in the leaching solution of magnesium as to insure stability of the compound "sodium-magnesium sulfate" in the presence of free sodium nitrate.

5. The method of extracting nitrate from nitrate-bearing materials containing sulfate, which comprises leaching the material at temperatures not exceeding about 58° C. in the presence of such concentration in the leaching solution of potassium as to insure the stability of the compound "potassium-magnesium sulfate" in the presence of free sodium nitrate.

6. The method of extracting nitrate from nitrate-bearing materials containing sulfate, which comprises leaching the material at temperatures not exceeding about 58° C. in the presence of such concentration in the leaching solution of magnesium and potassium as to insure the stability of the compounds "sodium-magnesium sulfate" and "potassium-calcium sulfate" in the presence of free sodium nitrate.

7. The method of extracting nitrate from nitrate-bearing materials containing sulfate, which comprises leaching the material at temperatures not exceeding about 58° C. in the presence of such concentrations in the leaching solutions of certain stabilizing agents as to prevent the formation of and make unstable the existence of compounds consisting in one part of sodium nitrate and in the other part of a sulfate constituent of the nitrate-bearing material.

8. The method of extracting nitrate from nitrate-bearing materials containing sulfate, which comprises leaching the material at temperatures not exceeding about 58° C. in the presence of such concentrations in the leaching solutions of certain stabilizing agents as to insure the stability of the anhydrous compound sodium calcium sulfate in the presence of free sodium nitrate.

9. The method of extracting nitrate from nitrate-bearing materials containing sulfate, which comprises leaching the material at temperatures not exceeding about 58° C. in the presence of such concentrations in the leaching solutions of certain stabilizing agents as to prevent the formation of and make unstable the existence of compounds consisting in one part of sodium nitrate and in the other part of a sulfate constituent of the nitrate-bearing material, subjecting the solution resulting from the leaching operation to refrigeration, and maintaining by limiting the lower temperature of the refrigeration operation such concentrations of the aforesaid stabilizing agents in the solution as are required in the leach liquor for the purposes aforesaid.

10. The method of extracting nitrate from nitrate-bearing materials containing sulfate, which comprises leaching the material at temperatures not exceeding about 58° C. in the presence of such concentrations in the leaching solutions of certain stabilizing agents as to prevent the formation of and make unstable the existence of compounds consisting in one part of sodium nitrate and in the other part of a sulfate constituent of the nitrate bearing material, subjecting the solution resulting from the leaching operation to refrigeration, and carrying out the refrigerating operation in the presence of compounds effective for depressing the solubility of the form of sodium sulfate in the nitrate-bearing material for the purpose of increasing the range of temperature over which commercially pure sodium nitrate can be separated.

11. The method of extracting nitrate from nitrate-bearing materials containing sulfate, which comprises leaching the material at temperatures not exceeding about 58° C. in the presence of such concentrations in the leaching solutions of certain stabilizing agents as to prevent the formation of and make unstable the existence of compounds consisting in one part of sodium nitrate and in the other part of a sulfate constituent of the nitrate-bearing material, subjecting the solution resulting from the leaching operation to refrigeration, and maintaining in said solution concentrations of minor salts of the character specified by limiting the lower temperature of the refrigeration operation at a degree and in such manner as not to remove the excess of such minor salts effective for depressing the solubility of the form of sodium sulfate in the nitrate-bearing material.

12. The method of extracting nitrate from nitrate-bearing materials containing sulfate, which comprises leaching the material at temperatures not exceeding about 58° C., treating the resulting solution by refrigeration for the recovery of nitrate therefrom, and maintaining in the solution agents stabilizing sulfate compounds other than sulfate compounds with sodium nitrate by limiting the lower temperature of the refrigeration operation to avoid excessive removal of such compounds.

13. The method of extracting nitrate from nitrate-bearing materials containing sulfate, which comprises leaching the material at temperatures not exceeding about 58° C., treating the resulting solution by refrigeration for the recovery of nitrate therefrom, and maintaining in the solution agents effective for depressing the solubility of the form of sodium sulfate in the nitrate-bearing material.

14. The method of extracting nitrate from nitrate-bearing materials containing sulfate, which comprises leaching the material at temperatures not exceeding about 58° C. in the presence of such concentrations in the leaching solution of potassium, magnesium, calcium, and sodium as to insure the stability of the compounds "potassium-magnesium sulfate," "sodium-magnesium sulfate," "potassium-calcium sulfate" and anhydrous "sodium-calcium sulfate" in the presence of free sodium nitrate.

In testimony whereof I affix my signature.

CHARLES LALOR BURDICK.